Sept. 8, 1931.  R. N. MOORE  1,822,818
DEVICE FOR FORMING PLANT PROTECTORS
Filed May 7, 1930
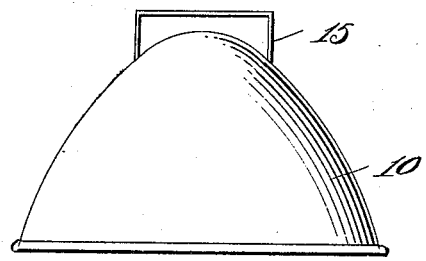
Fig. 1
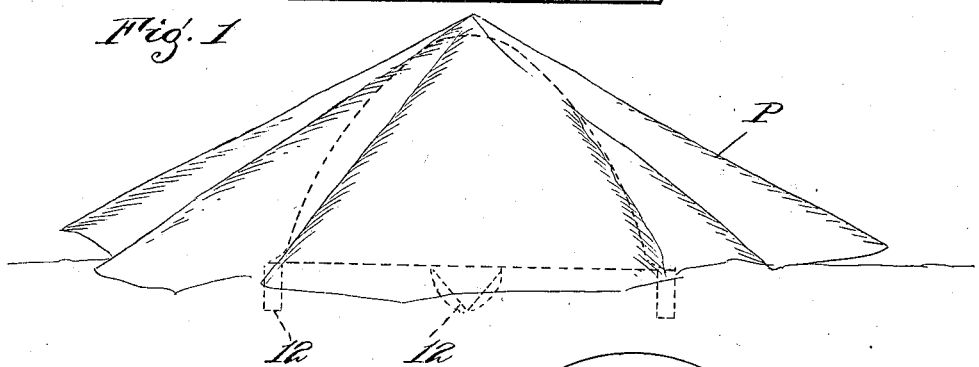
Fig. 2
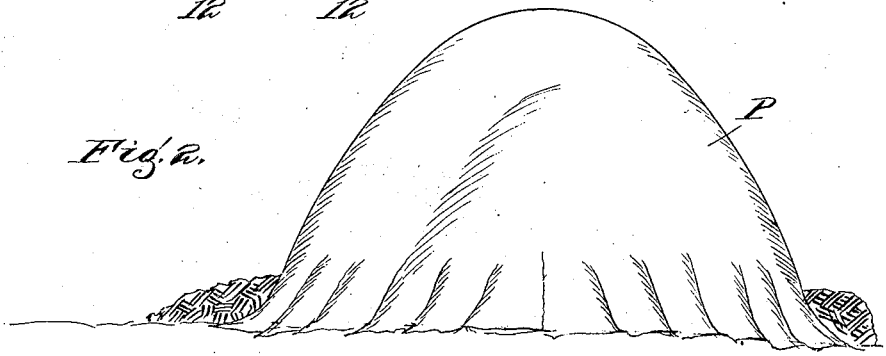
Fig. 3
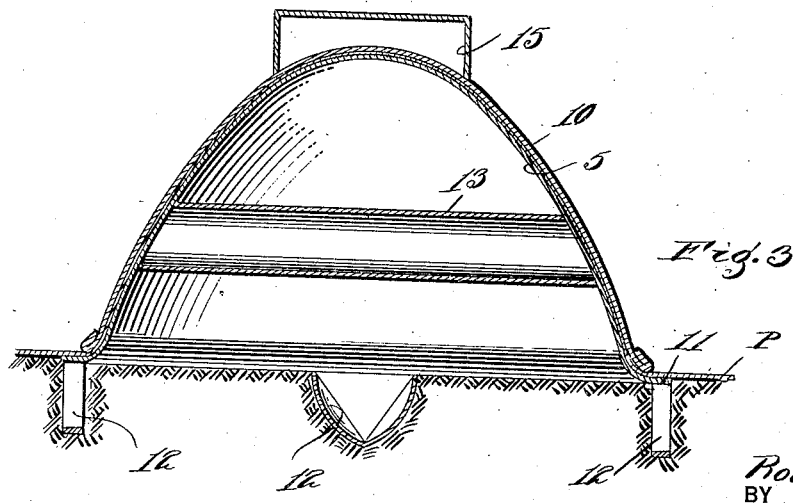
INVENTOR
Robert N. Moore
BY
ATTORNEY Patented Sept. 8, 1931

1,822,818

UNITED STATES PATENT OFFICE

ROBERT N. MOORE, OF TEMPE, ARIZONA

DEVICE FOR FORMING PLANT PROTECTORS

Application filed May 7, 1930. Serial No. 450,520.

My invention is a device for forming plant protectors from sheets of flexible material and placing the formed protector over seeds or plants as desired.

An object of the present invention is to provide a device of this character whereby the protector forming and setting operation may be performed.

Further the invention provides a plant protector forming device whereby flat sheets of paper or other flexible material may be quickly and conveniently shaped to produce protective coverings or hoods and then set in position over the plants or seeds.

It is another object of the present invention to provide a combined plant protector forming and shaping device which embodies a pair of interfitting bowl-like sections between which a flexible sheet is adapted to be pressed to produce a hood-like plant protector.

With the preceding and other objects, and advantages in mind, the invention consists in the novel combination of elements, constructions and arrangements of parts and operations to be hereinafter more fully described, claimed and illustrated in the accompanying drawings, wherein:

Figure 1 is an elevation of the parts of the device in the act of being brought into mating relation to form a plant protector;

Fig. 2 is an elevation of the formed plant protector; and

Fig. 3 is a vertical sectional view of the invention with a sheet of flexible material pressed therebetween.

Referring to the invention in detail a pair of identical concavo-convex mold members 5 and 10 is provided. The form member 5 terminates in an annular flange 11 at its lower edge and attached to the under face thereof at spaced intervals is a plurality of V-shaped ground penetrating elements 12 which serve to anchor the form member 5 to the ground as disclosed in Fig. 3. A tubular handle member 13 extends horizontally within this member 5 and has its ends welded or otherwise secured to the walls thereof at diametrically opposite points. The handle pressing member serves as a medium of manipulating the member 5 and also to lend rigidity to the same.

The pressing member 10 is of such size as to have a tight fit on the member 5 so that when the two members are nested as disclosed in Fig. 3 and the member 10 rotated the paper or other flexible material will be given the semi-elliptic configuration disclosed in Fig. 2.

For the purpose of manipulating the pressing member 10 a U-shaped handle 15 is attached to the upper end thereof.

The operation of the invention is as follows: A flat sheet of paper or other suitable material P to form the protector is laid over the form member 5 which has been previously placed on the ground as above stated or held in the hand by the handle member 13. The pressing member 10 is then nested on the member 5 and the edges of the sheet extended laterally on the ground. Upon turning the member 10 on the member 5 back and forth the paper or other flexible material will be shaped to conform to the contour of the members 5 and 10. The member 10 containing the formed hood or protector is now lifted by grasping the lower edges of the member 10 and the protector at diametrically opposite points and removing the hood and pressing member from the form 5. The member 10 containing the formed protector is then placed over the plant or seed and a small amount of earth allowed to gravitate from the upper end of the member 10. The descending earth falls upon the edges of the hood as disclosed in Fig. 2 to anchor the same in position over the seed or plant. Upon lifting the member 10 upwardly the completed plant protector will be left in position on the ground and over the plant or seed.

With my invention a maximum amount of plant protectors may be formed and set in a minimum period of time. Moreover the plant protectors are relatively strong in that they are crimped and shaped uniformly.

With reference to crimping the protectors it is pointed out that this is accomplished by the turning movement of the member 10 on the member 5. Due to the crimps or folds in the finished protectors they will be given sufficient body to stand up without props or other supports.

I claim:

1. In a device for forming concavo-convex hoods from sheet material, a pair of concavo-convex members to be arranged in nested relation with the sheet material therebetween, and means for simultaneously rotating and exerting pressure on one of such members to cause the sheet to crimp and cause the same to assume and retain concavo-convex shape.

2. In a device for forming concavo-convex hoods from sheet material, a pair of concavo-convex members to be arranged in nested relation with the sheet material therebetween, and a handle for simultaneously rotating and exerting pressure on one of such members to cause the members to crimp the sheet and cause the same to assume and retain concavo-convex shape.

3. In a sheet shaping device, a form adapted to rest upon the ground, ground engaging elements carried thereby for holding the form stationary, a pressing member of the same contour as the form and adapted to be received thereon, and a handle on the pressing member whereby the latter is pressed against and rotated on the form.

4. In a sheet shaping device, a form adapted to rest upon the ground, ground engaging elements carried thereby for holding the form stationary, a pressing member of the same contour as the form and adapted to be received thereon, and a handle on the pressing member whereby the latter is pressed against and rotated on the form, the pressing member also serving as a holder for the shaped sheet whereby the latter may be placed over a plant or seed.

ROBERT N. MOORE.